US008285570B2

(12) United States Patent
Meyer et al.

(10) Patent No.: US 8,285,570 B2
(45) Date of Patent: Oct. 9, 2012

(54) MATCHING SYSTEM FOR RIDE RESERVATION PLATFORMS

(75) Inventors: Evan Meyer, Santa Monica, CA (US); Jeffrey Chernick, Santa Monica, CA (US); Ben Dalton, Bloomington, IN (US)

(73) Assignee: Rideamigos Corp., Santa Monica, CA (US)

( * ) Notice: Subject to any disclaimer, the term of this patent is extended or adjusted under 35 U.S.C. 154(b) by 0 days.

(21) Appl. No.: 12/870,417

(22) Filed: Aug. 27, 2010

(65) Prior Publication Data

US 2011/0054956 A1 Mar. 3, 2011

Related U.S. Application Data

(60) Provisional application No. 61/237,957, filed on Aug. 28, 2009.

(51) Int. Cl.
*G06Q 10/00* (2006.01)
*G06Q 50/00* (2006.01)

(52) U.S. Cl. ................................ 705/5; 705/6; 701/201

(58) Field of Classification Search .................. 705/5, 6; 701/209, 202, 201
See application file for complete search history.

(56) References Cited

U.S. PATENT DOCUMENTS

| | | | | |
|---|---|---|---|---|
| 7,080,019 | B1 * | 7/2006 | Hurzeler | 705/6 |
| 7,660,743 | B1 * | 2/2010 | Messa et al. | 705/26.25 |
| 8,140,256 | B1 * | 3/2012 | Dos-Santos et al. | 701/117 |
| 2001/0056363 | A1 * | 12/2001 | Gantz et al. | 705/9 |
| 2003/0100993 | A1 * | 5/2003 | Kirshenbaum et al. | 701/202 |
| 2003/0177020 | A1 * | 9/2003 | Okamura | 705/1 |
| 2004/0049424 | A1 * | 3/2004 | Murray et al. | 705/14 |
| 2004/0267580 | A1 * | 12/2004 | Becker | 705/5 |
| 2006/0059023 | A1 * | 3/2006 | Mashinsky | 705/5 |
| 2006/0095329 | A1 * | 5/2006 | Kim | 705/14 |
| 2006/0276960 | A1 * | 12/2006 | Adamczyk et al. | 701/201 |
| 2007/0276595 | A1 * | 11/2007 | Lewinson et al. | 701/209 |
| 2008/0091342 | A1 * | 4/2008 | Assael | 701/202 |
| 2009/0119135 | A1 * | 5/2009 | Schoeman et al. | 705/5 |
| 2010/0121662 | A1 * | 5/2010 | Becker | 705/5 |
| 2011/0093301 | A1 * | 4/2011 | Walker | 705/5 |

OTHER PUBLICATIONS

"2008 NY Xpo for Business Encourages Ride Share RideAmogs Provides Free Ride Share Tool for Event Attendees to Cut Carbon Emissions," published by prweb.com on Nov. 10, 2008, pp. 1-2 of 2.*
Sarah Nassauer, "Zipcar Plans Partnership with Zimride," published by the Wall Stree Journal on Apr. 8, 2009, pp. 1-2 of 2.*

* cited by examiner

*Primary Examiner* — John Hayes
*Assistant Examiner* — Brian Epstein
(74) *Attorney, Agent, or Firm* — King & Spalding LLP

(57) ABSTRACT

The invention relates to a system capable of electronically matching transportation reservations with existing, new, or potential reservations, so that the orders can be combined, the reservation shared between requesting parties, utilization and management of transportation provider inventory and costs can be optimized, and savings opportunities for customers may be provided. Costs may also be divided proportionally based on a combination of distance and/or time traveled, or other cost accrual methods per riding party, and split/billed electronically via the reservation system. The system can operate as a standalone reservation repository or in concert with one or many existing reservation providers.

1 Claim, 3 Drawing Sheets

MATCHING SYSTEM FOR RIDE RESERVATION PLATFORMS

FIELD OF INVENTION

The invention is a system that electronically matches transportation reservations with existing, new, or potential reservations, so that the orders can be combined, the reservation shared between requesting parties, utilization and management of transportation provider inventory and costs can be optimized, and savings opportunities for customers may be provided. Costs may also be divided proportionally based on a combination of distance and/or time traveled, or other cost accrual methods per riding party, and split and/or billed electronically via the reservation system. The system can operate as a standalone reservation repository or in concert with one or many existing reservation providers.

BACKGROUND OF THE INVENTION

A number of prior inventions relate to methods for individuals to order transportation services through technology mediums like mobile phones, web platforms, and travel reservation systems. US Patent Publication 2002/0072938, titled "Ground transportation internet reservation system" (application Ser. No. 09/924,804, abandoned), discloses an on-line/Internet interface connecting the public, travel agencies, corporate travel offices and thousands of car service companies. In addition to handling various back office billing and record keeping functions, this invention makes chauffeured vehicle services available on a basis comparable to that of other historic elements of the travel industry. Some other industry leading travel reservation systems used by travel agencies and travel offices of corporations are WorldSpan, Sabre, Galileo, and Amadeus (Europe).

Other companies such as RideCharge, have released products for use with mobile phones that allow corporate travel managers and individuals to control ground travel costs with electronic booking, payment, and expense management for taxi, sedan, limo and shuttle services throughout the US. Individual car services also have applications that allow corporate clients and individuals to book car services directly via electronic forums and by phone.

Still others have proposed methods which enable individuals to discover other travelers with similar and compatible travel plans, for purposes of contacting them and negotiating shared travel agreements. A representative method is described in U.S. Pat. No. 7,080,019 to Hurtzeler, the disclosure of which is hereby incorporated by reference.

With millions of ride reservations processed annually, many of the starting and ending points of these rides have distances close to one another, and overlap in the time they are taken. Therefore, an opportunity presents itself to conjoin applicable reservations, in order to place multiple people in the same vehicle, thus reducing travel expenses for each party as well as carbon footprints. At present, there is no seamless and electronic method of connecting these car service reservations so that similar rides can be matched and shared. The present invention will add ride sharing capabilities to existing, or newly created platforms, to address this inefficiency.

SUMMARY OF THE INVENTION

The invention is a system that electronically matches transportation reservations with existing, new, or potential reservations, so that the orders can be combined, the reservation shared between requesting parties, utilization and management of transportation provider inventory and costs can be optimized, and savings opportunities for customers may be provided. Costs may also be divided proportionally based on a combination of distance and/or time traveled, or other cost accrual methods per riding party, and split/billed electronically via the reservation system. The system can operate as a standalone reservation repository or in concert with one or many existing reservation providers.

The ride reservations may come from any web, telephone, database, mobile device, direct database communication, or other booking system where a ride may be scheduled. A booking system may include any of the aforementioned systems, as well as any travel, car, airline, event, ticketing, or other booking system, whereby the ride matching layer could appropriately be integrated.

The present invention will match clients' ride reservations going to relatively the same place at relatively the same time so that rides are shared; thus, traveler expenses will be reduced on a per match basis. The "relatively" depends on the parameters set within the ride share platform ride matching algorithm (i.e. user preferences, pre-defined business rules, and any geotemporal relationships between involved parties and their requested reservations). Said matching includes, but is not limited to any of the various algorithms delineated herein or any new and improved algorithm made available by the ride share platform. Various settings/parameters may be adjusted within the administration section provided to the client, on a per integration basis.

The ride share platform will store the ride in its database in order to match this ride with other rides if applicable. If the ride booked is not capable or allowed to be stored in the ride share platform database as per the client's request, the ride share platform may create an approved connection with the existing ride database in order to search for matched rides that may reside in the ride share platform, or other existing databases within the ride share platform network. An example like the defined, may support an implementation whereby disparate clients may agree to allow cross-client matching in order to increase matching potential.

Each client may have different requirements for setup and deployment of the present invention. It is therefore important to note that each client may perform slight variations of implementing such a feature onto their platform, given the unpredictability of minor technological circumstances that could slightly alter the described setup and deployment strategy.

DETAILED DESCRIPTION OF THE INVENTION

In various embodiments, the key components of the invention may include: a networked computer which hosts the server system software; one or more networked computers that act as remote transportation reservation providers; and/or a pre-defined protocol for the reservation providers and matching system to communicate.

"Reservation providers" are defined as sources of transportation reservation information and include but are not limited to transportation services, reservation systems, travel management systems, and event ticket providers.

"Transportation providers" include but are not limited to taxi services, black car services, town car services, hybrid vehicle services, luxury vehicle services, chauffeured transportation services, van services, limo services, boat services, airplane services, jet services, charter services, and the like.

The "ride share platform" is any system (e.g., a general purpose or special purpose computer) that is configured or adapted to perform the function described herein.

In a non-limiting example of reservation matching process, (1) through a reservation system a user A makes a reservation for a specific time and date; (2) the reservation system connects to the reservation matching system and transmits the details of the reservation; (3) the reservation matching system processes the reservation and determines there are no existing matches in the system; (4) the reservation matching system saves the reservation for future matching; (5) through the same or a different reservation system, a user B creates a reservation; (6) the reservation system connects to the reservation matching system and transmits the details of the reservation; (7) the reservation matching system processes the reservation and determines that the reservation A matches with reservation B; (8) the reservation matching system responds to the reservation system which presents user B with option of sharing the reservation; and (9) if user B accepts, then reservation A is amended to include user B, they are presented with the amended reservation information, and the matching system is notified. If user B opts not to share, the reservation system finalizes a new reservation and the matching system is notified.

Figure 1:
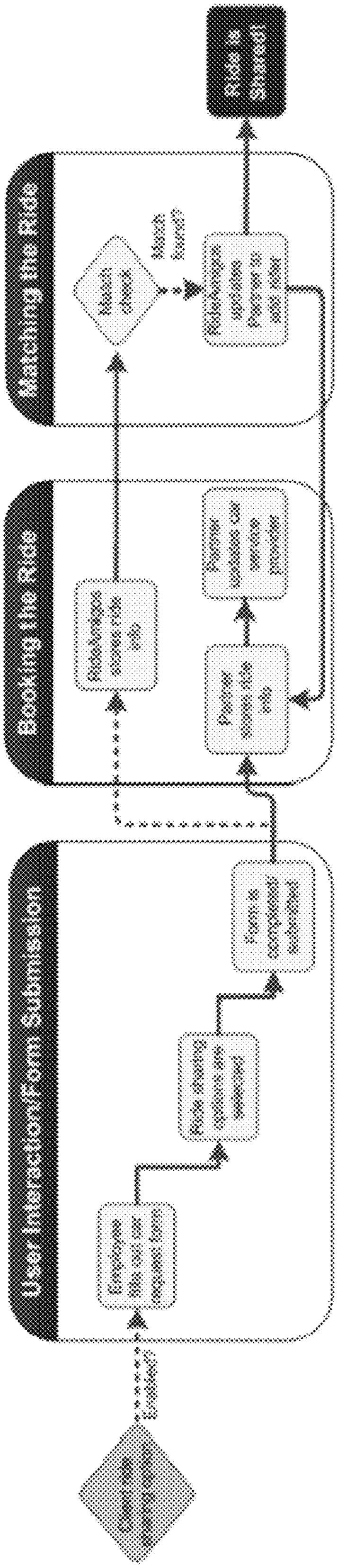
FIG. 1. shows an exemplary flow diagram of a ride-matching instantiation within a car reservation system.

In an embodiment of the invention according to FIG. 1, an organization may have the need to enable such a feature, whereas, an alternative embodiment may provide a general public user a more instant and streamlined capability of participation. In either case, a form to request a vehicle may be filled out, whereby ride-sharing options may be shown to the user, and further submitted for booking Both the ride share platform and the reservation system partner, or "RSP," may store ride data at this time. The ride share platform may build additional business logic around storing this info based on the options selected in the vehicle request form. The RSP may pass this information off to the car service provider, while the ride share platform checks for a match against other submitted Rides. If a match is found, the ride share platform may update the RSP to add an additional rider to the ride. The RSP may store and relay this info, updating their system as well as the car service provider, thereby creating a "shared ride."

Figure 2:
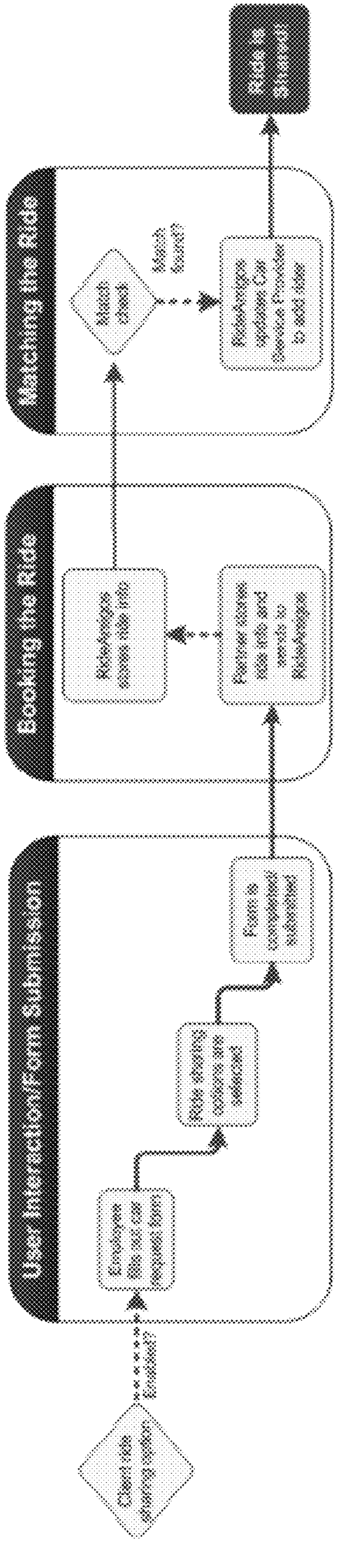
FIG. 2. shows an exemplary flow diagram of a different but similar ride-matching instantiation from FIG. 1, within a car reservation system.

In an embodiment of the invention according to FIG. 2, to depict the potential of implementation disparity and variety, the system of FIG. 2 works similar to that in FIG. 1, except the reservation communication/transactions to the car service provider rely on the ride share platform instead of the RSP.

Figure 3:
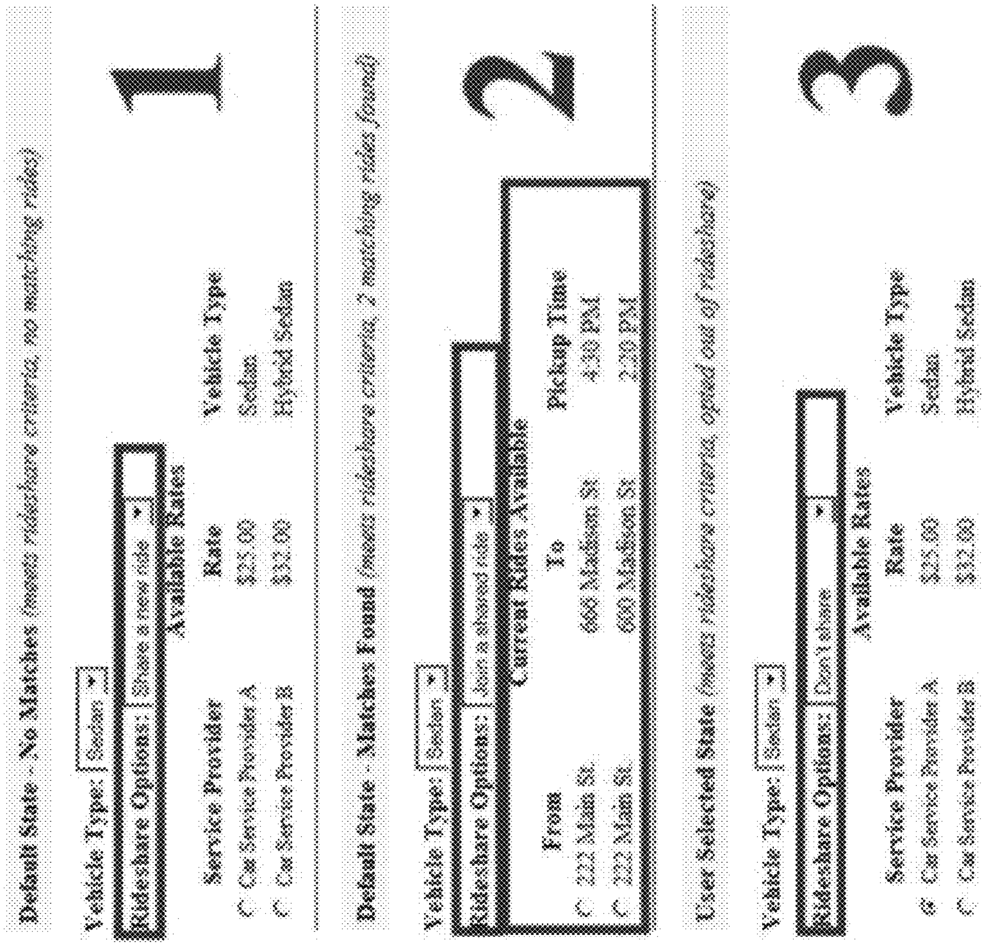
FIG. 3. shows an exemplary user interface for a ride-matching instantiation within a car reservation system.

An alternate embodiment of the invention is shown in FIG. 3. According to FIG. 3, "Boxed off" areas are potential insertions of ride-matching elements into a potential existing interface of an RSP. When the user is filling out a form to book a reservation, a ride-sharing selector may be presented with three options, as portrayed in sections 1, 2, and 3 respectively of FIG. 3:

1. Share a new ride
   1. Defaulted if no match is found
   2. Service provider/rate/vehicle matrix displayed
2. Join a shared ride
   1. Defaulted if match is found
   2. Service provider/rate/vehicle matrix displayed after user selects the specific ride to join from the showing the "Current Rides Available."
3. Don't share
   1.Service provider/rate/vehicle matrix displayed In one embodiment of the invention, a reservation and booking system captures ride data from users, stores the data, calculates a match between users, and transmits the match to a transportation provider. In one embodiment, ride data is not made available to users until after a match is calculated. For example, in one embodiment, a user's contact information is not made available to other users until after a match is calculated and a match is offered to a user. In one embodiment, a match is offered to a user by a transportation provider and the user is excluded from directly accessing information regarding other users prior to the offer and/or confirmation of a match. In one embodiment, users are excluded from direct communication with each other prior to the ride share platform confirming a match and communicating the match to the first and/or second user and/or prior to the rideshare itself. In one embodiment, all communication between users prior to the rideshare occurs indirectly, for example through a transportation provider or via other indirect means. In one embodiment, no communication is available between users and a user has no information about other users.

EXAMPLES

Below is a detailed example of how the ridesharing layer could be implemented as an additional feature for a third party, ride booking software.

The present invention resides on existing software/web interfaces. It therefore must be capable of connecting with various components in order to transmit the data needed for a successful ride match, provide the user with options for the ride match via the existing interface, adjust parameters for the matching algorithm, or any further transmission, manipulation, and feedback needed to convey information to the user, or communicate between disparate systems to successfully match two riders.

The goal of this implementation would be to provide an opportunity for passengers making reservations through the third party web interface to share reservations with other passengers traveling within certain parameters.

Component Examples/Definitions

Rideshare IFrame: A HTML Frame that is dynamically loaded into the user interface that provides a description of the ride sharing feature along with the user interface additions for selecting ride sharing options.

Rideshare Criteria: The specific information entered in the existing user interface that needs to be specific values or within specific ranges of values in order for the user to be eligible for a ride share. The client may have the option of limiting the use of the ride sharing feature to any field values on the existing interface. These fields may include, but are not limited to pickup location (e.g. location must be set to a residential or commercial street address and is not in a defined exclusion list), additional stops (e.g. more than X number of stops excludes the ride sharing eligibility), dropoff location (rules may be the same of different from the pickup location), vehicle type (e.g. restriction may be based on whether or not the vehicle if of a specific type or class, such as sedans, limos, SUV's, etc.).

Rideshare Options Dropdown: The dropdown that will be the selection source of ride sharing options. This field may have an option to create a new ride share, create a new ride without the possibility of sharing, or select one of the existing rides that are eligible for sharing. The options to create new rides with or without ride sharing may always be available to the rider, while matched rides the user can take may be displayed only if there are matches. The client may have the option of making the match selection mandatory or optional to the rider, and that choice may also be contingent on the hierarchical role of the rider in the organization.

Additional Definitions

Car Request Form: The form that users book travel and/or car reservations through.

The Client: A "client" is an organization that uses a technological medium to order transportation, and may be given certain ride sharing capabilities in order to comply with their business practices, customs, or specific cultural needs. Such capabilities may include, but are not limited to, defining acceptable match criteria, allowing/disallowing participation of certain riders based on their hierarchical role in the organization, include/exclude types of locations (e.g. airports, specific buildings, towns, etc.), and the like.

The User: The individual booking and taking the ride.

Administration

In order to allow the client to have configuration capabilities, an additional configuration page (a.k.a. "rideshare admin page," or "ride share controls page") may be provided. Some of these options may include, but are not limited to:

1. ride share enabler (i.e. turns ride sharing feature on and off), 2. ride share mandate: (i.e. restricts the ability to proceed in the car request form if a matched ride is available, but not selected in the rideshare dropdown), 3. maximum distance/time between destinations control (i.e. regulates whether or not a match is valid based on the destination distance/time differential of the employee looking to share a ride and the previously booked ride), 4. maximum time difference between pickup times control (regulates whether or not a match is valid based on the pick up time differential between the employee looking to share a ride and the previously booked ride), 5. minimum required difference between booking and departure times for a shared ride control (regulates whether or not a match is valid based on the differential between the booking time of the employee looking to share a ride and the previously booked ride's departure time), etc.

Explanation Of User Information Workflow

A user may begin by authenticating inside the client-provided single sign-on system. This would ensue with the user visiting the transportation booking portal, and completing the required fields on the car request form.

At an agreed upon part of the user's ride booking workflow, if the user's submitted information thus far meets the rideshare criteria, this implementation of the invention will then perform its essential task for rideshare facilitation by first inserting certain relevant web-page elements. These elements include, but are not limited to, the Rideshare IFrame, and the Rideshare Dropdown. The Rideshare IFrame may be requested via HTTP(S) POST, GET or other transmission protocol, and with required data from the car request form. The user may then choose one of three potential ridesharing paths if applicable: (1) create a non-shared ride by selecting "Do not share this ride" in the rideshare dropdown, (2) create a shared ride by selecting "Create new ride share" in the rideshare dropdown, or (3) join a shared ride by selecting to join an existing, matched ride in the rideshare dropdown.

The matched rides will be generated by employing a singular algorithm, or combination of various algorithms created by the ride share platform. Some examples include:

Geometrical Algorithm Examples circle based: pick-up and drop-off points that are within a certain maximum radius away from one another, within a certain approved time frame of either pick-up time or desired arrival time of the requested parties, and/or rectangle based: using the maximum and minimum latitude and longitude of the pick-up and drop-off coordinates, to create a rectangle. All rides with pick-up and drop-off coordinates will match. To further optimize this algorithm, a reference line can then be drawn to ensure that pick-up points and drop-off points exist on the same side of the rectangle, and/or, Temporal Algorithm Examples 1. each point of the route understood to be taken by a user, can be used to ensure that the route of the matched user does not deviate more than a parameter-set time away from the original user (includes traffic), and/or 2. any defined or new geometrical based algorithm applied in conjunction with and defined or new temporal based algorithm.

A dynamic "Ride Sharing Status" section to convey the user's ride sharing selections or participation information may also be inserted in a designated and agreed upon area in the existing interface. Existing elements within the interface or selected-values provided by the third-party that may have its information superseded by ride sharing participation, will potentially need to be modified and displayed with the newest values for these fields. One way the ride share platform may do this, is by italicizing and providing informative tooltips (e.g., Pickup Time, Car Provider, Car Rate) to convey any modifications to the ride, causal to the user's ride sharing selections.

As the user completes the booking process on the car request form, or any other time determined more appropriate within in the ride booking process, data transmission will ensue. Data from the third-party will need to be transmitted to the ride share platform for processing and response.

When the user books her ride by creating a new, unmatched ride, the ride share platform must be passed certain data in order to store this ride and check for matches on subsequent bookings The exact time this information will be passed to the ride share platform may vary from implementation to implementation based on the client's existing hardware, data structures, processes, etc. It is however, recommended to be passed as early as possible (i.e. directly after the booking process). Passed data may include, but is not limited to, pickup location (e.g. address, city name, state, zip code, etc.), dropoff location (e.g. address, city name, state, zip code, etc.), pickup date and time (e.g. date, time), a ride reference number (used to reference and the ride in both the third-party and the ride share platform system), etc. The ride share platform may also consume data from the third-party in a similar fashion, if a matched ride is selected, ride sharing is declined, or any future options initiated by the third party or the ride share platform, in order to more appropriate allow ride sharing for its users.

Upon successful booking of a shared ride, the ride share platform may be notified with any/all relevant information via SOAP or other web service. If the user selected a matched ride in the rideshare dropdown, the third-party updates the reservation to add an additional passenger. If a booked-matched ride is canceled, the ride share platform is notified via SOAP, or other web service, and the third-party updates the reservation to remove the additional passenger. The process is complete when the user is picked up at designated time and delivered to destination.

Other embodiments of said invention may be:

1. used on any internally or externally developed system, or wherever a ride-matching feature can be feasibly/viably inserted, 2. built with and/or built to communicate with RSP by using any legacy, present day, or newly created programming, scripting, database or any other style language(s) that would allow for such reproduction.

We claim:

1. A system for providing a shared ride to a first traveler and second traveler, the system comprising:

a reservation provider;

one or more transportation providers; and a remote ride share platform, wherein the reservation provider comprises a computer providing a user interface to the first traveler and second traveler, the reservation provider is in communication with the one or more transportation providers and the remote ride share platform, and the reservation provider is adapted to:

receive a first travel itinerary from the first traveler and transmit the first travel itinerary to the remote ride share platform;

receive a second travel itinerary from the second traveler and transmit the second travel itinerary to the remote ride share platform;

dynamically provide one or more ride share options received from the remote ride share platform to the second user via the user interface, wherein the ride share options include the option to share a ride with the first traveler;

receive a request to share a ride with the first traveler from the second traveler via the user interface; and modify the first travel itinerary to include the second traveler; and wherein the remote ride share platform is adapted to:

receive and save the first travel itinerary from the reservation provider;

receive the second travel itinerary from the reservation provider;

determine that the second travel itinerary matches the first travel itinerary;

dynamically transmit ride share options for the second traveler to the reservation provider, based on the determination that the second travel itinerary matches the first travel itinerary.

* * * * *